Sept. 15, 1953  C. W. BLACKBURN  2,651,995
SWITCH FOR AUTOMATIC PUMPING UNITS
Filed Oct. 23, 1951

INVENTOR.
C.W. BLACKBURN
BY
Hudson & Young
ATTORNEYS

UNITED STATES PATENT OFFICE 2,651,995

SWITCH FOR AUTOMATIC PUMPING UNITS

Charles W. Blackburn, Bartlesville, Okla., assignor to Phillips Petroleum Company, a corporation of Delaware Application October 23, 1951, Serial No. 252,715

12 Claims. (Cl. 103—21)

This invention relates to a pipe line system. In another aspect, it relates to a booster station for a pipe line.

In a manually operated booster station, it may be necessary to employ as many as five operators. In addition to eliminating payrolls of such operators the use of automatic controls at a booster station results in reduced installation costs, the small added cost of the control system being more than offset by the savings which occur.

It is an object of this invention to provide an automatic control system for booster pumping stations in a pipe line system.

It is a further object to provide an automatic control system for booster stations wherein the booster pump or pumps are controlled by the rate of flow of fluid through the pipe line.

It is a still further object to provide a novel system of interlocking protective devices to effect reliable operation of the system.

It is a further object to provide a system which is of low cost, and reliable in operation.

Various other objects, advantages and features of the invention will become apparent from the following detailed description taken in conjunction with the accompanying drawings, in which.

Figure 1:
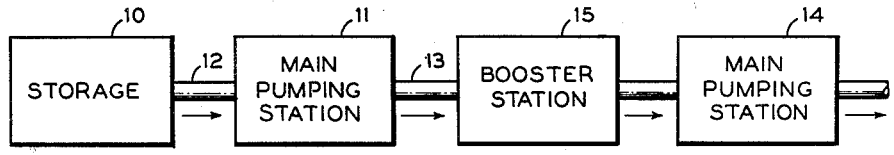
Figure 1 is a block diagram of the pipe line system of this invention.

Referring now to Figure 1, a fluid, such as gasoline or oil, is pumped from storage 10 to a main pumping station 11 through a pipe line 12. Pumping station 11 forces the fluid through a pipe line 13 to a second main pumping station 14 from which the fluid may be pumped either through an additional length of pipe line or to storage, as desired. Between the main pumping stations 11 and 14 is a booster station 15 which, in accordance with the invention, is operated only when the rate of flow of fluid through the pipe line exceeds a predetermined value. Booster station 15 can be completely unattended, and the system includes protective features to automatically stop the operation of the booster station (1) if the pressure upstream of the booster station becomes excessively low, (2) if the pressure downstream of the booster station becomes excessively high, or (3) if there is a failure of the pump lubricating system.

Figure 2:
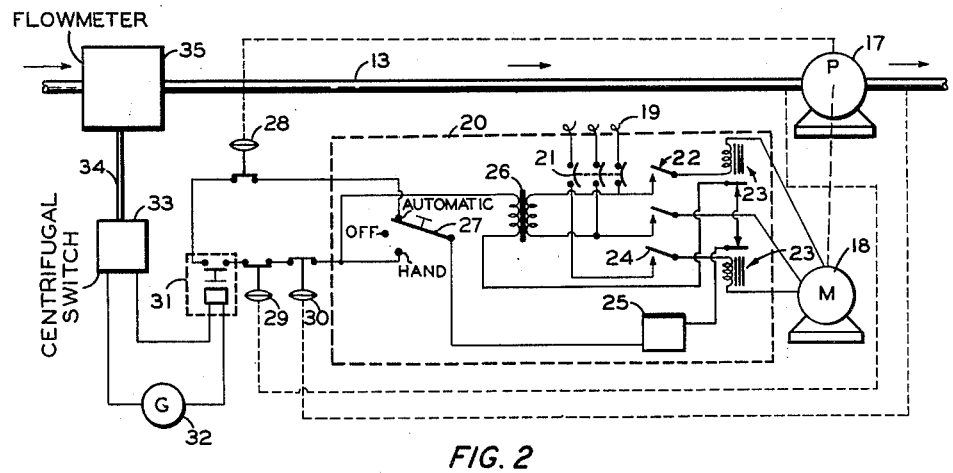
Figure 2 is a schematic circuit diagram of the apparatus at a booster pumping station utilizing one pump.

Although the invention is applicable to various types of pumping units, I have shown, in Figure 2, a booster station utilizing a centrifugal pump 17 connected in the pipe line 13, this pump being driven by a three-phase alternating current motor 18. Electric current is fed to the motor 18 from a source represented by conductors 19 through a starter device 20 which includes a hand-operated circuit breaker 21, an automatically operated contactor 22, and overload relays 23. Contactor 22 is provided with three normally open contacts 24 connected in the respective phases of the power line and an operating coil 25 to effect closure of the contacts 24. The coil 25 is connected in circuit with the normally closed contacts of overload relays 23, the secondary winding of a transformer 26, the primary winding of which is supplied with current from any lines of the alternating current source. Coil 25 also is connected in circuit with a three-position switch 27. When the switch 27 is in the "hand" position, coil 25 is energized directly by current flowing through transformer 26. When switch 27 is in the "automatic" position, coil 25 and transformer 26 are connected in circuit with normally closed contacts of first, second and third pressure-actuated switches 28, 29 and 30, respectively, together with a normally open set of contacts of a time delay relay 31. The latter relay has an operating coil which is connected in circuit with a current source 32 and a centrifugal switch 33. The centrifugal switch is driven by a shaft 34 which, in turn, is driven by a flow meter 35 positioned in the pipe line 13 upstream of pump 17. Flow meter 35 is of the type wherein the speed of rotation of shaft 34 is proportional to the rate of flow of fluid through the pipe line 13.

Assuming switch 27 to be in the "automatic" position and hand-operated circuit breaker 21 to be closed, when the rate of flow of fluid through pipe line 13 is below a predetermined value, shaft 34 is not rotated at sufficient speed by flow meter 35 to operate switch 33. Accordingly, relay 31 remains deenergized, as is the coil 25, so that contactor 22 is open and the motor circuit is broken. When the rate of flow exceeds said predetermined value, shaft 34 is rotated by flow meter 35 at a sufficient speed as to actuate and close centrifugal switch 33. This supplies current to the operating coil of relay 31, which closes after a predetermined time delay interval, thereby energizing the coil 25 with resultant closure of contactor 22 and operation of the pump-motor unit 17, 18. This operation continues until the rate of flow falls below the predetermined value, at which time operation of the motor 18 is terminated due to the opening of centrifugal switch 33 and deenergization of relay 31.

It will be understood that there are minor periodic fluctuations in flow rate due to functioning of the pumps at main pumping station 11, Figure 1. Therefore, as the flow rate rises, due to the aforesaid fluctuations, it might exceed the predetermined value momentarily and then drop below it several times before the flow rate is continuously above said predetermined value. The time delay of relay 31 is so adjusted that these fluctuations do not cause several momentary actuations of relay 31 and resultant intermittent operation of motor 18, which might cause surges on the power line and rapid deterioration of the starter-motor combination. However, when the flow rate rises above the predetermined value for a time greater than the time delay period of relay 31, the system operates in the manner already described.

The pressure switches 28, 29 and 30 are all closed during normal operation. Pressure switch 28 is connected to a tap in the hydraulic lubricating system of pump 17. If the lubricating system of the pump should fail, the resultant decrease in pressure opens switch 28 and, therefore, prevents further operation of the motor and pump until the system is repaired. As shown, pressure switch 29 is connected to a tap in pipe line 13 upstream of pump 17. Should the pressure drop excessively, this switch is opened to interrupt operation of the motor and pump system, thereby protecting the pump from running dry with possible damage to the pump impeller. This switch also prevent possible fluid hammering occurring when the first portion of a slug of pipe line fluid passes to the booster station. Pressure switch 30 is operated to break the motor-operating circuit when the pressure in the pipe line downstream of the pump rises excessively. This might occur where a positive displacement pump is utilized at main pumping station 14, Figure 1, and operation of this pump is interrupted.

Figure 3:
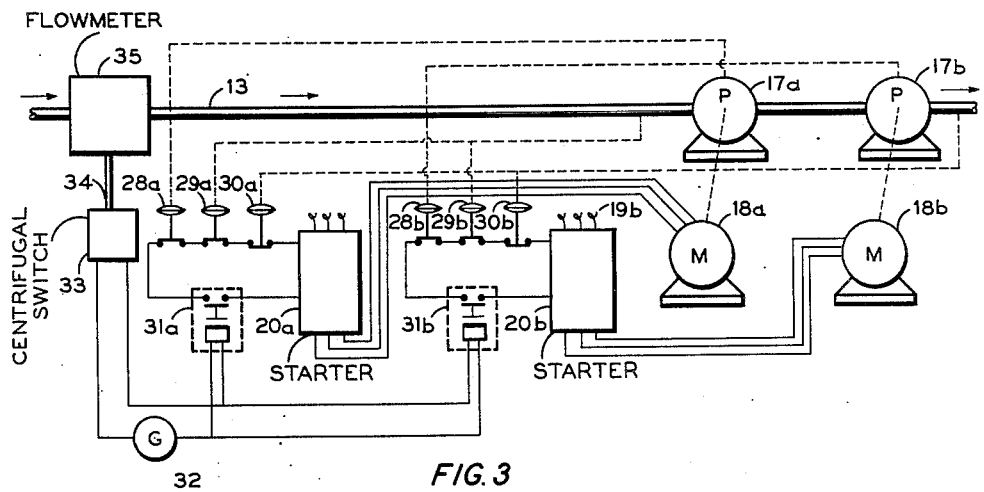
Figure 3 is a schematic view of the apparatus at a pumping station where a plurality of pumps is utilized.

In Figure 3, I have shown a system wherein a plurality of pumps are used at the booster station. The operation of the system is quite similar to that of Figure 2, and duplicated parts are indicated by similar reference numerals with different letters, non-duplicated parts being indicated by the same reference numerals as in Figure 2.

In this figure, it will be noted that there are, in effect, two similar units of the type described in connection with Figure 2, the operating coils of time delay relays 31a, 31b being connected in parallel and in circuit with current source 32 and centrifugal switch 33. Accordingly, when the rate of flow is above a predetermined value and switch 33 is closed, both motor-operating circuits are completed at the expiration of the delay periods of relays 31a and 31b. Preferably and advantageously, these relays have different time delay periods. For example, the delay of relay 31a can be fifteen seconds and the delay of relay 31b can be 180 seconds. This prevents both motors from coming on the electrical line at the same time, which is undesirable from the standpoint of power supply.

It will be noted that pressure switch 28a is connected to the lubricating system of pump 17a while pressure switch 28b is connected to the lubricating system of pump 17b. Therefore, failure of either lubricating system will interrupt the operation only of the motor driving the affected pump, the operation of the other motor-pump unit proceeding in the usual manner. Pressure switches 29a, 29b are connected to a common tap upstream of both pump units while pressure switches 30a, 30b are connected to a common tap downstream of both pumps. Hence, the operation of both motor-pump units is terminated should the upstream pressure drop excessively or the downstream pressure become excessively high.

It will be understood that it is within the scope of the invention to cause operation of pumps 17a, 17b at different rates of pipe line flow rather than at the same rate as in Figure 3. In such case, each relay 31 is provided with its individual centrifugal switch 33 driven by flow meter 35. Alternatively, each switch can have an individual flow meter associated therewith.

It will be evident that I have achieved the objects of my invention in providing a completely automatic booster station for a pipe line pumping system, the system operating automatically responsive to changes in the rate of flow of pipe line fluids. Further, the system is provided with interlocking safety features to prevent damage thereto in the event that any dangerous conditions are encountered.

While the invention has been described in connection with a present, preferred embodiment thereof, it is to be understood that this description is illustrative only and is not intended to limit the invention.

I claim:

1. In a pipe line system, in combination, a pair of main pumping stations, a pipe line connecting said stations, and a booster station connected in the pipe line between said main pumping stations, said booster station including a pump connected in the pipe line, means for driving said pump, a flow meter at said booster station and connected in said pipe line, and a control device responsive to said flow meter to operate said driving means and pump when the flow rate in said pipe line rises above a predetermined value, said control means disabling said driving means when the rate of flow falls below such predetermined value.

2. In a pipe line system, in combination, a pair of main pumping stations, a pipe line connecting said stations, and a booster station connected in the pipe line between said main pumping stations, said booster station including a pump connected in the pipe line, an electric motor for driving said pump, a source of current for said electric motor, a switch device connected in circuit with said source and said motor, a flow meter at said booster station connected in said pipe line, said switch device being controlled by said flow meter so as to connect said motor to the current source when the flow rate in said pipe line exceeds a predetermined value and to disconnect said motor from said current source when the flow rate falls below such predetermined value.

3. In the combination of claim 2, a time delay device associated with said switch device to delay operation thereof for a selected interval after said flow rate rises above said predetermined value.

4. In a pipe line system, in combination, a pair of main pumping stations, a pipe line connecting said stations, and a booster station connected in the pipe line between said main pumping stations, said booster station including a pump connected in the pipe line, a centrifugal switch controlling the energization of said pump, a positive displacement flow meter connected in the pipe line upstream from said pump, and means connecting said flow meter to said switch so as to cause operation of said pump when the flow rate rises above a predetermined value and to disable said pump when the flow rate falls below such predetermined value.

5. In a pipe line system, in combination, a pair of main pumping stations, a pipe line connecting said stations, and a booster station connected in the pipe line between said main pumping stations, said booster station including a pump connected in the pipe line, an electric motor for driving said pump, a current source for said electric motor, a starter unit connected in circuit with said current source and said motor, said starter including a contactor connected in circuit with said current source and said motor, said contactor having an operating winding, a time delay relay having a set of normally open contacts connected in circuit with said operating winding and a current source, said relay including an operating coil, a flow meter at said booster station connected in the pipe line upstream from said pump, said flow meter having a rotatable shaft which moves at a speed proportional to the rate of flow of fluid in said pipe line, a centrifugal switch driven by said shaft, and means connecting said centrifugal switch in circuit with said current source and said operating coil.

6. In a pipe line system, in combination, a pair of main pumping stations, a pipe line connecting said stations, and a booster station connected in the pipe line between said main pumping stations, said booster station including a pair of pumps connected in series in said pipe line at said booster station, a motor for driving each pump, a source of motor-operating current, and control apparatus associated with each motor including a switch device connected in circuit with said current source and said motor, said control apparatus being operable to connect and disconnect said motor from said current source, a flow meter connected in the pipe line at said booster station upstream from said pumps, and means actuated by said flow meter to operate said control apparatus to connect both motors in circuit with said current source when the flow rate in the pipe line is above a predetermined value and to disconnect said motors from said current source when the flow rate falls below such predetermined value.

7. In a pipe line system, in combination, a pair of main pumping stations, a pipe line connecting said stations, and a booster station connected in the pipe line between said main pumping stations, said booster station including a pair of pumps connected in series in said pipe line at said booster station, a motor for driving each pump, a source of motor-operating current, and control apparatus associated with each motor including a switch device connected in circuit with said current source and said motor, said control apparatus being operable to connect and disconnect said motor from said current source, a time delay relay controlling the operation of each switch device, each time delay relay having an operating coil, a flow meter connected in said pipe line at said booster station upstream from said pumps, a centrifugal switch operated by said flow meter, and means connecting said switch in circuit with both operating windings and a current source, the time delay of one of said relays being substantially greater than the time delay of the other of said relays.

8. In a pipe line system, in combination, a pair of main pumping stations, a pipe line connecting said stations, and a booster station connected in the pipe line between said main pumping stations, said booster station including a pair of pumps connected in series in said pipe line at said booster stations, a motor for driving each pump, a source of motor-operating current, and control apparatus associated with each motor including a contactor connected in circuit with said current source and said motor, said contactor having an operating coil, a circuit for energizing said operating coil including a set of normally open contacts of a time delay relay and a current source, each time delay relay having an operating coil, a flow meter in said pipe line at said booster station, and means actuated by said flow meter to operate said coil so as to connect both motors in circuit with said current source when the flow rate in the pipe line is above a predetermined value and to disconnect said motor from said current source when the flow rate falls below said predetermined value.

9. A booster pumping station comprising, in combination, a pipe line, a pair of pumps connected in series in said pipe line, an electric motor for driving each pump, a current source, a pair of contactors connecting said current source in series in circuit with the respective motors, each contactor having an operating coil, first, second and third pressure-responsive switches connected in circuit with each operating coil and a current source, said first switches being maintained in normally closed position by hydraulic pressure in the lubricating system of the respective pumps, said second switches being maintained in normally closed position by pressure at a tap in said pipe line upstream of both pumps, and said third switches being maintained in normally closed position and connected to a tap in said pipe line downstream of both pumps so as to open when said pressure downstream of said pumps becomes excessive.

10. A booster station including a pump connected in a pipe line, an electric motor for driving said pump, a current source for said electric motor, a starter unit connected in circuit with said current source and said motor, said starter including a contactor connected in circuit with said current source and said motor, said contactor having an operating winding, a switch controlling the energization of said operating winding, a flow meter connected in the pipe line upstream from said pump, and means connecting said flow meter to said switch so as to energize said winding when the flow rate rises above a predetermined value and to deenergize said winding when the flow rate falls below such predetermined value.

11. A booster pumping station comprising, in combination, a pipe line, a pump connected in said pipe line, an electric motor for driving said pump, a current source, a contactor connecting said current source in circuit with said motor, said contactor having an operating coil, first, second and third pressure-responsive switches connected in circuit with said operating coil and a current source, said first switch being maintained in normally closed position by hydraulic pressure in the lubricating system of said pump, said second switch being maintained in normally closed position by pressure at a tap in said pipe line upstream of said pump, and said third switch being maintained in normally closed position and connected to a tap in said pipe line downstream of said pump so as to open when said pressure downstream of said pump becomes excessive.

12. In a pipe line system, a booster station including a pump connected in a pipe line, a centrifugal switch controlling the energization of said pump, a positive displacement flow meter connected in said pipe line, and means connecting said flow meter to said switch so as to cause operation of said pump when the flow rate rises above a predetermined value and to disable said pump when the flow rate falls below such predetermined value.

CHARLES W. BLACKBURN.

References Cited in the file of this patent

UNITED STATES PATENTS

| Number | Name | Date |
| --- | --- | --- |
| 2,339,957 | Smith | Jan. 25, 1944 |
| 2,440,981 | Smith | May 4, 1948 |